United States Patent
Tsuchitori et al.

(10) Patent No.: US 12,352,352 B2
(45) Date of Patent: Jul. 8, 2025

(54) CONTROL SYSTEM OF VEHICLE INCLUDING AUTOMATIC TRANSMISSION

(71) Applicant: Mazda Motor Corporation, Hiroshima (JP)

(72) Inventors: Yuki Tsuchitori, Aki-gun (JP); Manabu Sasahara, Aki-gun (JP); Makoto Yamada, Aki-gun (JP); Masato Ohtani, Aki-gun (JP); Shigeru Nagayama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/637,697

(22) Filed: Apr. 17, 2024

(65) Prior Publication Data

US 2024/0384787 A1    Nov. 21, 2024

(30) Foreign Application Priority Data

May 15, 2023   (JP) .................................. 2023-080014

(51) Int. Cl.
*F16H 61/30*      (2006.01)
*F16H 61/06*      (2006.01)
(Continued)

(52) U.S. Cl.
CPC ........... *F16H 61/30* (2013.01); *F16H 61/061* (2013.01); *F16H 61/686* (2013.01);
(Continued)

(58) Field of Classification Search
CPC .. F16H 61/061; F16H 2061/062; F16H 61/30; F16H 61/686; F16H 63/3026;
(Continued)

(56) References Cited

U.S. PATENT DOCUMENTS

| | | | |
|---|---|---|---|
| 10,302,193 B2 | 5/2019 | Fukuda et al. | |
| 2017/0241487 A1* | 8/2017 | Sasahara | F16D 13/52 |
| 2020/0332886 A1* | 10/2020 | Hongawara | F16H 61/686 |

FOREIGN PATENT DOCUMENTS

| | | |
|---|---|---|
| JP | 2017207141 A | 11/2017 |
| JP | 2020175851 A | 10/2020 |

* cited by examiner

*Primary Examiner* — Richard M Lorence
(74) *Attorney, Agent, or Firm* — Alleman Hall & Tuttle LLP (57) ABSTRACT

An automatic transmission control system includes an automatic transmission provided with a first friction engagement element including friction plates, a piston movable between engaged and disengaged positions for engaging and disengaging, respectively, the friction plates, and engaging and disengaging hydraulic pressure chambers applying engaging and disengaging hydraulic pressure for setting the piston at the engaged and disengaged positions, respectively, first and second hydraulic pressure control valves which adjust the engaging and disengaging hydraulic pressure, respectively, and a controller which controls the first and second hydraulic pressure control valves. When disengaging the engaged first friction engagement element, the controller performs a first control to the first hydraulic pressure control valve to raise the engaging hydraulic pressure, a second control to the second hydraulic pressure control valve to then raise the disengaging hydraulic pressure, and a third control to the first hydraulic pressure control valve to then reduce the engaging hydraulic pressure.

10 Claims, 7 Drawing Sheets

(51) Int. Cl.
  *F16H 61/686* (2006.01)
  *F16H 63/30* (2006.01)
(52) U.S. Cl.
  CPC ... *F16H 63/3026* (2013.01); *F16H 2061/062* (2013.01); *F16H 2063/303* (2013.01); *F16H 2200/006* (2013.01); *F16H 2200/2012* (2013.01); *F16H 2200/2043* (2013.01)
(58) Field of Classification Search
  CPC ......... F16H 2063/303; F16H 2200/006; F16H 2200/2012; F16H 2200/2043; F16H 2306/32; F16D 25/0638; F16D 25/10; F16D 25/14; F16D 48/06; F16D 48/02; F16D 48/066
  See application file for complete search history.

| | REV GEAR | 1ST GEAR | 2ND GEAR | 3RD GEAR | 4TH GEAR | 5TH GEAR | 6TH GEAR | 7TH GEAR | 8TH GEAR |
|---|---|---|---|---|---|---|---|---|---|
| CL1 |  | O |  | O |  | O | O | O |  |
| CL2 |  |  | O | O | O |  | O |  | O |
| CL3 | O |  |  |  | O | O | O | O | O |
| BR1 | O | O | O |  |  |  |  | O | O |
| BR2 | O | O | O | O | O | O |  |  |  |

CONTROL SYSTEM OF VEHICLE INCLUDING AUTOMATIC TRANSMISSION

TECHNICAL FIELD

The present disclosure relates to a control system of a vehicle including an automatic transmission which is provided with friction engagement elements.

BACKGROUND OF THE DISCLOSURE

Conventionally, for vehicles, a system is known which includes an automatic transmission provided with a plurality of friction engagement elements which can be in either an engaged state or a disengaged state, and forms a plurality of gear stages by selectively changing the friction engagement element to be engaged, a hydraulic pressure control valve which adjusts a hydraulic pressure applied to each of the plurality of friction engagement elements, and a controller which controls the hydraulic pressure control valve to change each of the friction engagement elements between the engaged state and the disengaged state.

Further, in recent years, JP2017-207141A and JP2020-175851A disclose friction engagement elements as described above, each of which includes a plurality of friction plates, a piston which is movable between an engaged position at which the friction plates are engaged with each other and a disengaged position at which the friction plates are disengaged, an engaging hydraulic pressure chamber for applying a hydraulic pressure to the piston to set the piston at the engaged position, and a disengaging hydraulic pressure chamber for applying a hydraulic pressure to the piston to set the piston at the disengaged position. By using such two hydraulic pressure chambers, smooth and prompt engagement and disengagement of the friction engagement element are performed to suppress a shock and feeling of wrongness when changing the gear stage of the automatic transmission, and secure a good response.

However, in the automatic transmission having the friction engagement element provided with the engaging hydraulic pressure chamber and the disengaging hydraulic pressure chamber, a shock due to a change in acceleration may occur in the vehicle when disengaging the friction engagement element in order to change the gear stage to a given gear stage. This is because, although a control to reduce the hydraulic pressure of the engaging hydraulic pressure chamber is performed and a control to raise the hydraulic pressure of the disengaging hydraulic pressure chamber is performed, when disengaging the friction engagement element, these controls are not performed at suitable timings. In more detail, when the hydraulic pressure of the engaging hydraulic pressure chamber is reduced, or after it is reduced, the hydraulic pressure of the disengaging hydraulic pressure chamber rises, and the transmitting torque of the friction engagement element is changed suddenly. Thus, the shock due to the change in acceleration occurs.

SUMMARY OF THE DISCLOSURE

The present disclosure is made in order to solve the problem of the conventional technology described above, and one purpose thereof is to provide a control system of a vehicle including an automatic transmission having a friction engagement element provided with an engaging hydraulic pressure chamber and a disengaging hydraulic pressure chamber, capable of suppressing a shock due to a change in acceleration which occurs when disengaging the friction engagement element.

In order to achieve the above-described purpose, a control system of a vehicle according to the present disclosure includes, an automatic transmission provided with a first friction engagement element able to change between an engaged state and a disengaged state, the first friction engagement element including a plurality of friction plates, a piston movable between an engaged position at which the plurality of friction plates are engaged and a disengaged position at which the plurality of friction plates are disengaged, an engaging hydraulic pressure chamber configured to apply a hydraulic pressure to the piston to set the piston at the engaged position (engaging hydraulic pressure), and a disengaging hydraulic pressure chamber configured to apply a hydraulic pressure to the piston to set the piston at the disengaged position (disengaging hydraulic pressure), a first hydraulic pressure control valve configured to adjust the hydraulic pressure applied to the engaging hydraulic pressure chamber of the first friction engagement element, a second hydraulic pressure control valve configured to adjust the hydraulic pressure applied to the disengaging hydraulic pressure chamber of the first friction engagement element, and a controller configured to control the first and second hydraulic pressure control valves to change the first friction engagement element between the engaged state and the disengaged state. When changing the first friction engagement element from the engaged state to the disengaged state, the controller performs a first control in which the first hydraulic pressure control valve is controlled to raise the hydraulic pressure applied to the engaging hydraulic pressure chamber, a second control in which after the first control the second hydraulic pressure control valve is controlled to raise the hydraulic pressure applied to the disengaging hydraulic pressure chamber, and a third control in which after the second control the first hydraulic pressure control valve is controlled to reduce the hydraulic pressure applied to the engaging hydraulic pressure chamber.

According to this configuration, when changing the first friction engagement element, the controller performs the first control in which the first hydraulic pressure control valve is controlled to raise the engaging hydraulic pressure, the second control in which the second hydraulic pressure control valve is controlled to raise the disengaging hydraulic pressure, and the third control in which the first hydraulic pressure control valve is controlled to reduce the engaging hydraulic pressure, in this order. Since the engaging hydraulic pressure is raised one time before raising the disengaging hydraulic pressure, it can certainly prevent the engaging hydraulic pressure from being overcome by the disengaging hydraulic pressure when applying the disengaging hydraulic pressure to disengage the first friction engagement element. Further, since the raised engaging hydraulic pressure is reduced after raising the disengaging hydraulic pressure, it can suppress the sudden change (nose diving) of the transmitting torque of the first friction engagement element when the disengaging hydraulic pressure is given. As described above, according to the present disclosure, a shock due to the change in acceleration can be suppressed, when disengaging the first friction engagement element.

In the present disclosure, the first hydraulic pressure control valve may be comprised of a valve capable of linearly adjusting the hydraulic pressure applied to the engaging hydraulic pressure chamber, and the second hydraulic pressure control valve may be comprised of an on-off valve. According to this configuration, when reducing the engaging hydraulic pressure in the third control, it can realize the control for linearly reducing the engaging hydraulic pressure by the first hydraulic pressure control valve at the desired rate of change to disengage the first friction engagement element smoothly and promptly. Therefore, it becomes possible to secure the shock control and the response when disengaging the first friction engagement element. Thus, in the present disclosure, it secures the controllability of the first friction engagement element by using the first hydraulic pressure control valve which is capable of linearly adjusting the hydraulic pressure. On the other hand, since the second hydraulic pressure control valve which adjusts the disengaging hydraulic pressure is comprised of the on-off valve, it can realize the simple configuration and control configuration of the first friction engagement element.

In the present disclosure, the automatic transmission may be further provided with a second friction engagement element different from the first friction engagement element. The automatic transmission may include a first gear stage at which the first friction engagement element is engaged and the second friction engagement element is disengaged, and a second gear stage adjacent to the first gear stage, at which the first friction engagement element is disengaged and the second friction engagement element is engaged. The control system may further include a third hydraulic pressure control valve configured to adjust a hydraulic pressure applied to the second friction engagement element to engage the second friction engagement element. When changing the gear stage from the first gear stage to the second gear stage, the controller may further perform a fourth control in which the third hydraulic pressure control valve is controlled to raise the hydraulic pressure applied to the second friction engagement element, in addition to the first to third controls. The controller may end the third control and the fourth control substantially simultaneously. According to this configuration, when disengaging the first friction engagement element (in detail, when changing the gear stage from the first gear stage to the second gear stage), the controller further performs, in addition to the first to third controls to the first friction engagement element, the fourth control to raise the hydraulic pressure applied to the second friction engagement element, and the controller ends substantially simultaneously the third control to the first friction engagement element (i.e., the third control to reduce the engaging hydraulic pressure) and the fourth control to the second friction engagement element. Therefore, the gear change can be completed smoothly.

In the present disclosure, the controller may start the third control and the fourth control substantially simultaneously. According to this configuration, the response of the gear change can be secured.

In the present disclosure, the first friction engagement element may be configured so that the plurality of friction plates are in a zero-clearance state, both when the hydraulic pressure is not applied to the engaging hydraulic pressure chamber, and when the hydraulic pressure is not applied to the disengaging hydraulic pressure chamber. According to this configuration, the plurality of friction plates are in a slipping state when the hydraulic pressure is not applied to the first friction engagement element. By applying the hydraulic pressure to the first friction engagement element in this state, the first friction engagement element can be engaged promptly. Therefore, the response when engaging the first friction engagement element can be secured.

In the present disclosure, the first friction engagement element may be changed to the engaged state, at least when starting the vehicle. According to the first friction engagement element which is in the zero-clearance state when the hydraulic pressure is not given as described above, when starting the vehicle, the first friction engagement element is engaged after carrying out a slip control, and therefore, the smooth start of the vehicle can be realized with sufficient accuracy.

DETAILED DESCRIPTION OF THE DISCLOSURE

Hereinafter, a control system of a vehicle including an automatic transmission according to one embodiment of the present disclosure is described with reference to the accompanying drawings.

[Overall Configuration]

Figure 1:
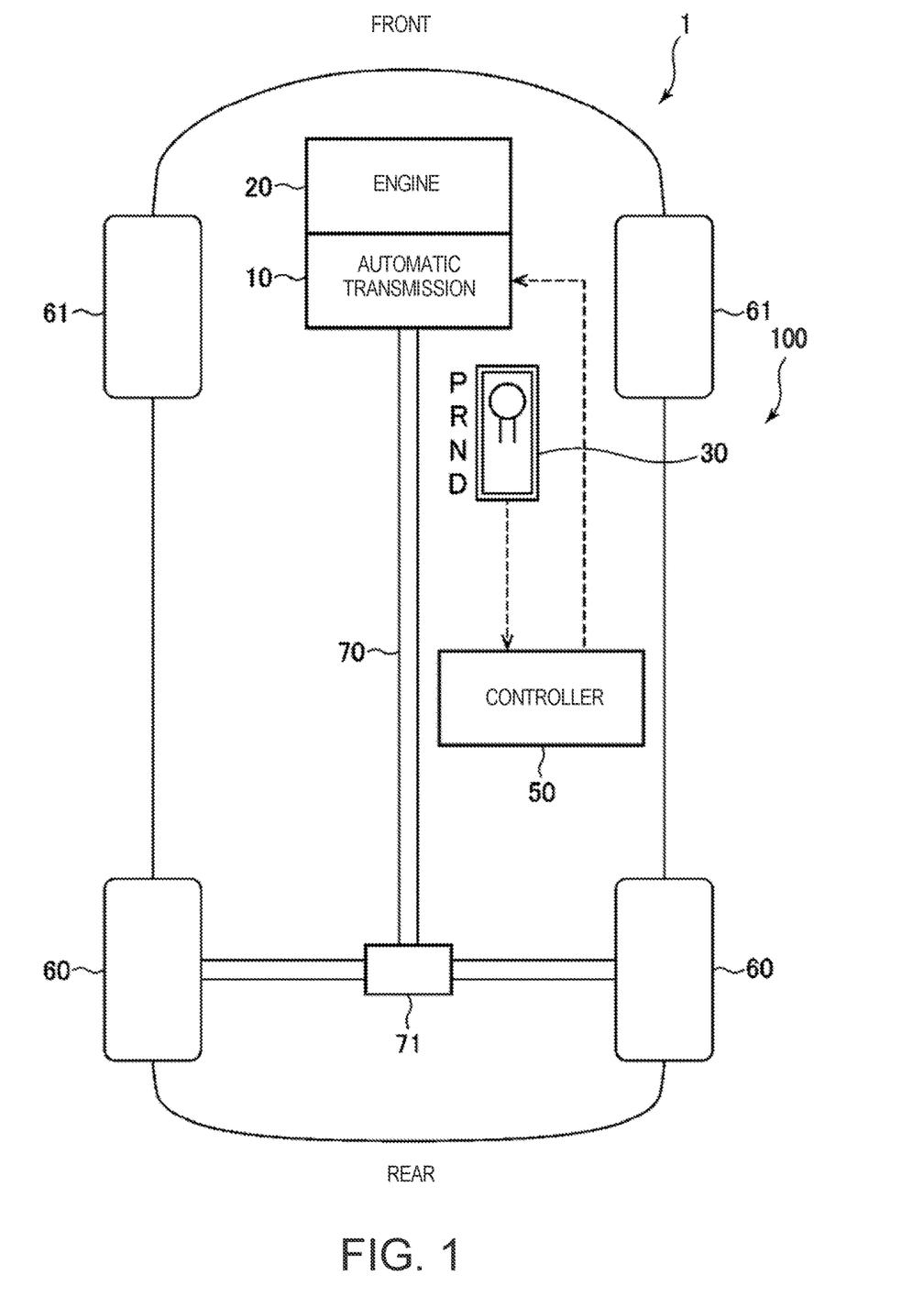
FIG. 1 is a view schematically illustrating a vehicle on which a control system of an automatic transmission according to one embodiment of the present disclosure is mounted.

FIG. 1 is a view schematically illustrating a vehicle on which a control system 100 according to this embodiment is mounted. As illustrated in FIG. 1, a vehicle 1 is a front-engine rear-drive type (FR type) vehicle, in which an engine 20 as a drive source is disposed at the front side of the vehicle 1, and an automatic transmission 10 is disposed rearward of the engine 20. A driving force of the engine 20 is transmitted to rear wheels (driving wheels) 60 via a power transmission path, such as the automatic transmission 10, a propeller shaft 70, and a differential gear 71 to propel the vehicle 1. Note that the present disclosure is not limited to the application to the FR-type vehicle 1, but it may also be applied to various vehicles, such as front-engine front-drive type (FF type) vehicles which drive front driving wheels (front wheels 61).

A shift lever 30 is disposed inside a cabin of the vehicle 1. The shift lever 30 selects the range (shift range) of the automatic transmission 10, and the range includes a parking range "P-range," a reverse range "R-range," a neutral range "N-range," and a drive range "D-range." A driver of the vehicle 1 operates the shift lever 30 to select a desired range. Note that such a range may additionally include an "M-range" for setting the automatic transmission 10 to a manual mode. The D-range, R-range, and M-range correspond to traveling ranges, and the N-range and P-range correspond to non-traveling ranges.

For example, the automatic transmission 10 may be a shift-by-wire type automatic transmission. In this case, the range selected by operation of the shift lever 30 by the driver is detected by a sensor (not illustrated), and an electric signal based on the detection result of the sensor is inputted into a controller 50. Then, the shift range of the automatic transmission 10 is changed by an output signal from the controller 50 based on the above-described electric signal.

[Configuration of Automatic Transmission]

Figure 2:
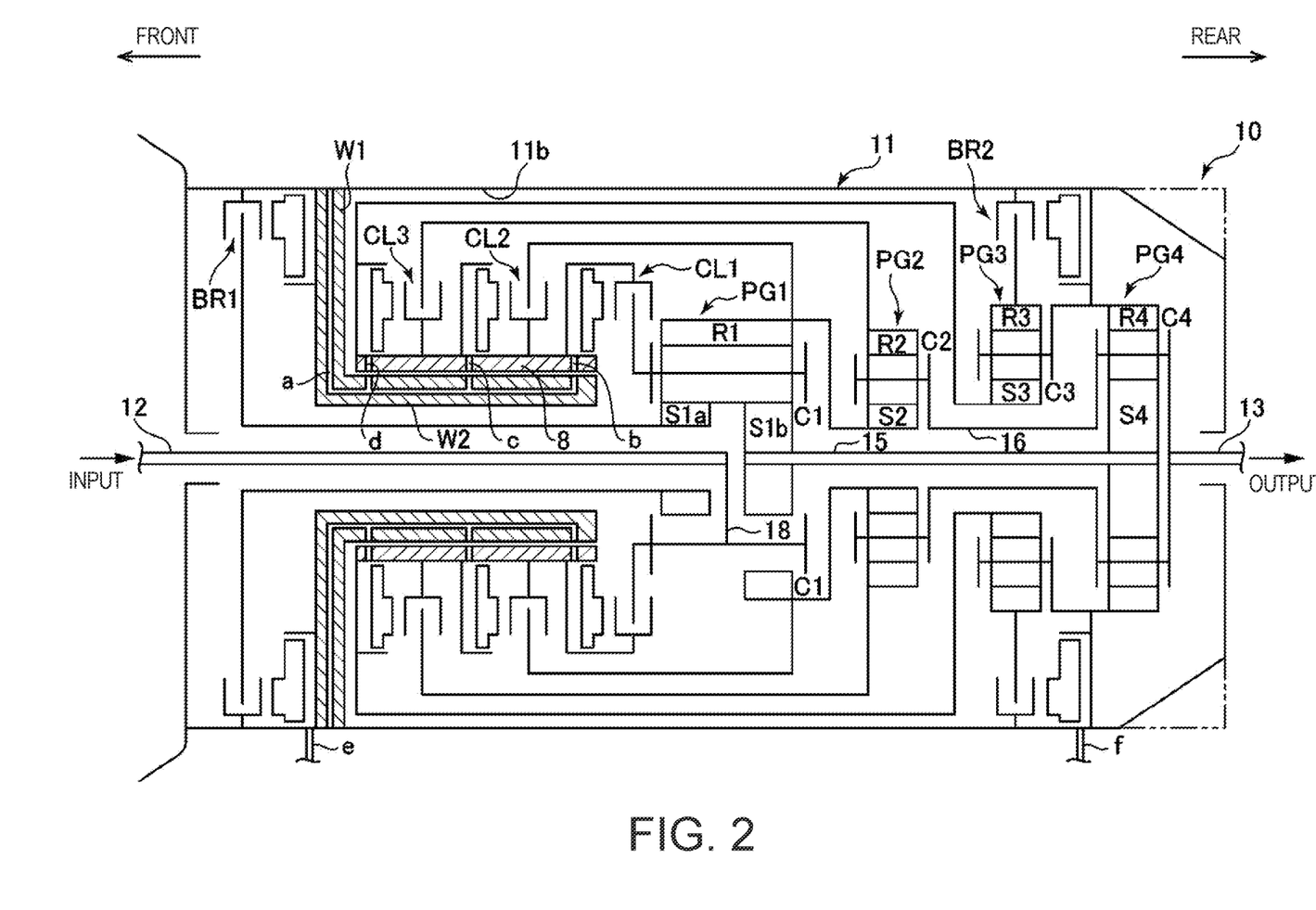
FIG. 2 is a view schematically illustrating an automatic transmission according to the embodiment of the present disclosure.

FIG. 2 is a view schematically illustrating the automatic transmission 10 according to this embodiment. As illustrated in FIG. 2, the automatic transmission 10 is a longitudinally-arranged automatic transmission, which includes a transmission case 11, an input shaft 12 inserted into the transmission case 11 from the engine 20, and an output shaft 13 projected from the inside of the transmission case 11 to the anti-drive-source side (the right side in this drawing). The automatic transmission 10 is disposed in a longitudinal posture in which the input shaft 12 and the output shaft 13 are disposed coaxially centering on an axis in the vehicle front-and-rear direction, and the input shaft 12 is located at the front side of the vehicle 1 and the output shaft 13 is located at the rear side of the vehicle 1. For this reason, below, the drive source side (the left side in this drawing) may be referred to as "the front side," and the anti-drive-source side (the right side in this drawing) may be referred to as "the rear side."

On the axis of the input shaft 12 and the output shaft 13, first, second, third, and fourth planetary gear sets (simply referred to as "the gear set") PG1, PG2, PG3, and PG4 are disposed sequentially from the front side (the drive source side).

Inside the transmission case 11, a first clutch CL1 is disposed forward of the first gear set PG1, a second clutch CL2 is disposed forward of the first clutch CL1, and a third clutch CL3 is disposed forward of the second clutch CL2. Further, a first brake BR1 is disposed forward of the third clutch CL3, and a second brake BR2 is disposed radially outside of the third gear set PG3. Thus, in the automatic transmission 10, from the front side (the drive source side), the first brake BR1, the third clutch CL3, the second clutch CL2, the first clutch CL1, and the second brake BR2 are disposed in this order in the axial direction. Note that the first to third clutches CL1-CL3, and the first and second brakes BR1 and BR2 correspond to "friction engagement elements."

The first to fourth gear sets PG1-PG4 are of a single pinion type in which pinions supported by a carrier directly mesh with a sun gear and a ring gear. The first gear set PG1 has a first sun gear, a first ring gear R1, and a first carrier C1 as rotating elements. The second gear set PG2 has a second sun gear S2, a second ring gear R2, and a second carrier C2 as rotating elements. The third gear set PG3 has a third sun gear S3, a third ring gear R3, and a third carrier C3 as rotating elements. The fourth gear set PG4 has a fourth sun gear S4, a fourth ring gear R4, and a fourth carrier C4 as rotating elements.

The first gear set PG1 is of a double sun gear type in which the first sun gear is divided into two in the axial direction. That is, the first sun gear has a front-side first sun gear S1*a* disposed at the front side in the axial direction, and a rear-side first sun gear S1*b* disposed at the rear side. Since the pair of first sun gears S1*a* and S1*b* have the same number of teeth, and mesh with the same pinions supported by the first carrier C1, the rotational speeds of the first sun gears S1*a* and S1*b* are always equal. That is, the pair of front and rear first sun gears S1*a* and S1*b* always rotate at the same speed, and when one stops rotating, the other also stops rotating.

In this automatic transmission 10, the first sun gear (in detail, the rear-side first sun gear S1*b*) and the fourth sun gear S4 are always coupled to each other, the first ring gear R1 and the second sun gear S2 are always coupled to each other, the second carrier C2 and the fourth carrier C4 are always coupled to each other, and the third carrier C3 and the fourth ring gear R4 are always coupled to each other. The input shaft 12 is always coupled to the first carrier C1, and the output shaft 13 is always coupled to the fourth carrier C4. In detail, the input shaft 12 is coupled to the first carrier C1 via a power transmission member 18 which passes through between the pair of front and rear first sun gears S1*a* and S1*b*. The rear-side first sun gear S1*b* and the fourth sun gear S4 are coupled to each other via a power transmission member 15. The fourth carrier C4 and the second carrier C2 are coupled to each other via a power transmission member 16.

The first clutch CL1 engages and disengages the input shaft 12 and the first carrier C1 with/from the third sun gear S3, when a piston reciprocates in the axial direction according to a hydraulic pressure being fed and discharged to/from a hydraulic pressure chamber by a hydraulic pressure control valve (not illustrated) to change the first clutch CL1 between an engaged state and a disengaged state. The second clutch CL2 engages and disengages the first ring gear R1 and the second sun gear S2 with/from the third sun gear S3, when a piston reciprocates in the axial direction according to a hydraulic pressure being fed and discharged to/from a hydraulic pressure chamber by a hydraulic pressure control valve (not illustrated) to change the second clutch CL2 between an engaged state and a disengaged state. The third clutch CL3 engages and disengages the second ring gear R2 with/from the third sun gear S3, when a piston reciprocates in the axial direction according to a hydraulic pressure being fed and discharged to/from a hydraulic pressure chamber by a hydraulic pressure control valve (not illustrated) to change the third clutch CL3 between an engaged state and a disengaged state.

Meanwhile, the first brake BR1 engages and disengages the transmission case 11 with/from the beginning sun gear (in detail, the front-side first sun gear S1*a*), when a piston reciprocates in the axial direction according to a hydraulic pressure being fed and discharged to/from a hydraulic pressure chamber by a hydraulic pressure control valve (not illustrated) to change the first brake BR1 between an engaged state and a disengaged state. The second brake BR2 engages and disengages the transmission case 11 with/from the third ring gear R3, when a piston reciprocates in the axial direction according to a hydraulic pressure being fed and discharged to/from a hydraulic pressure chamber by a hydraulic pressure control valve (not illustrated) to change the second brake BR2 between an engaged state and a disengaged state.

The transmission case 11 has, at an axial position between the first brake BR1 and the third clutch CL3, an annular vertical wall part W1 extending radially inward from an inner circumferential surface 11*b* of the transmission case 11, and a cylindrical cylinder wall part W2 extending rearward from an inner circumferential end of the vertical wall part W1. The cylinder wall part W2 is formed coaxially and so as to extend along an inner circumferential surface of a power transmission member 8.

Three housings lined up in the axial direction are formed radially outward of the power transmission member 8, and the pistons of the first clutch CL1, the second clutch CL2, and the third clutch CL3 are accommodated in the three housings, respectively.

Oil passages for supplying the hydraulic pressure to each of the hydraulic pressure chambers of the first clutch CL1, the second clutch CL2, and the third clutch CL3 are formed in the vertical wall part W1, the cylinder wall part W2, and the power transmission member 8. In detail, an oil passage a is formed in the vertical wall part W1 and the cylinder wall part W2, and oil passages b, c, and d are formed in the power transmission member 8. Then, the hydraulic pressure is supplied to the hydraulic pressure chamber of the first clutch CL1 through the oil passages a and b, the hydraulic pressure is supplied to the hydraulic pressure chamber of the second clutch CL2 through the oil passages a and c, and the hydraulic pressure is supplied to the hydraulic pressure chamber of the third clutch CL3 through the oil passages a and d. Note that, although not illustrated, communicating parts between the oil passage a and the oil passages b, c, and d between an outer circumferential surface of the cylinder wall part W2 and an inner circumferential surface of the power transmission member 8 are sealed with seal rings.

The piston of the first brake BR1 is accommodated in a housing formed forward of the vertical wall part W1. The hydraulic pressure chamber divided by this housing directly communicates with an oil passage e from the outside of the transmission case 11 (valve body). The piston of the second brake BR2 is accommodated in a housing which is fitted into the inner circumferential surface 11b of a rear part of the transmission case 11. The hydraulic pressure chamber divided by this housing directly communicates with an oil passage f from the outside of the transmission case 11 (valve body).

Figure 3:
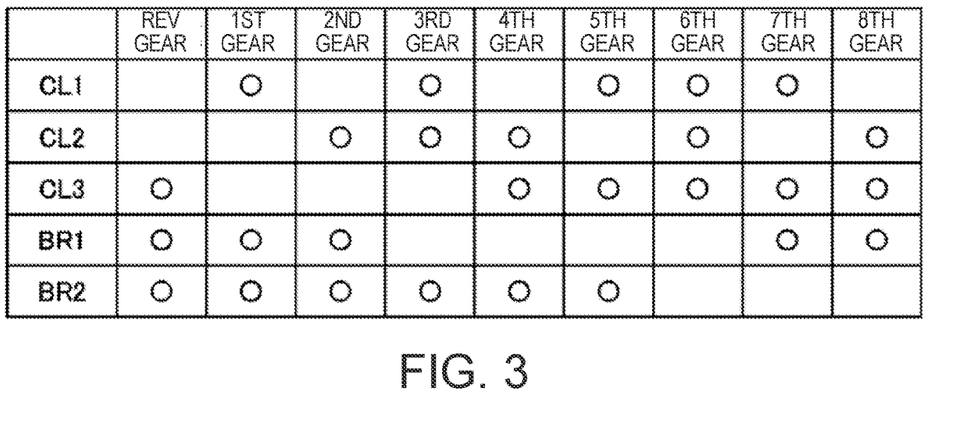
FIG. 3 is an engagement table of friction engagement elements of the automatic transmission according to the embodiment of the present disclosure.

Next, referring to FIG. 3, an engagement table of the friction engagement elements of the automatic transmission 10 according to this embodiment is described. According to the automatic transmission 10 having the configuration described above, as illustrated in the engagement table of FIG. 3, any one of the gear stages (the forward first to the eighth gears and the reverse gear) is formed in the automatic transmission 10 by selectively engaging three specific friction engagement elements among the five friction engagement elements (the first to third clutches CL1-CL3, and the first and second brakes BR1 and BR2). Fundamentally, one of the plurality of gear stages according to the vehicle speed is selected and applied.

In detail, as illustrated in FIG. 3, the reverse gear is formed when the third clutch CL3, the first brake BR1, and the second brake BR2 are engaged. The first gear is formed when the first clutch CL1, the first brake BR1, and the second brake BR2 are engaged. The second gear is formed when the second clutch CL2, the first brake BR1, and the second brake BR2 are engaged. The third gear is formed when the first clutch CL1, the second clutch CL2, and the second brake BR2 are engaged. The fourth gear is formed when the second clutch CL2, the third clutch CL3, and the second brake BR2 are engaged. The fifth gear is formed when the first clutch CL1, the third clutch CL3, and the second brake BR2 are engaged. The sixth gear is formed when the first clutch CL1, the second clutch CL2, and the third clutch CL3 are engaged. The seventh gear is formed when the first clutch CL1, the third clutch CL3, and the first brake BR1 are engaged. The eighth gear is formed when the second clutch CL2, the third clutch CL3, and the first brake BR1 are engaged.

[Configuration of Second Brake]

Figure 4:
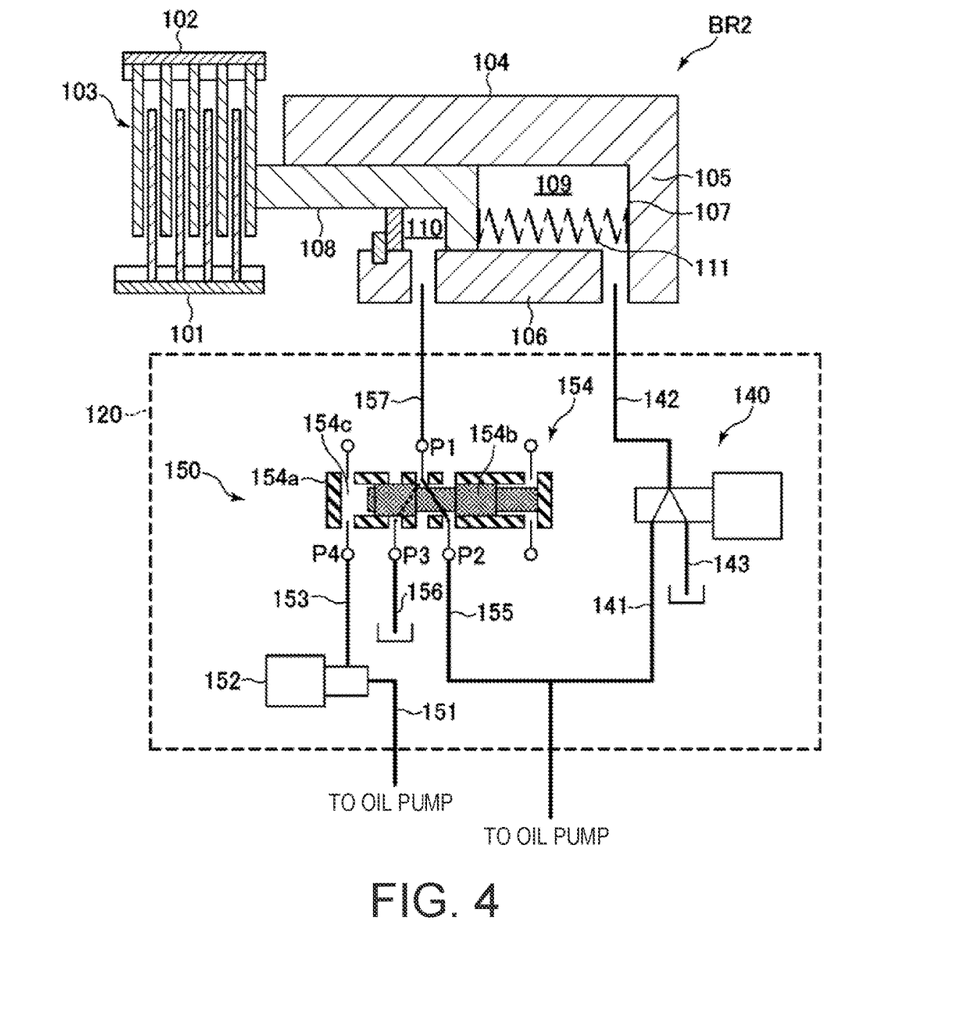
FIG. 4 is a view schematically illustrating a second brake and a hydraulic pressure control valve according to the embodiment of the present disclosure.

Next, referring to FIG. 4, a configuration of the second brake BR2 according to this embodiment is described. FIG. 4 is an outline block diagram of the second brake BR2 and a hydraulic pressure control valve 120 which controls the second brake BR2 according to this embodiment (partially illustrated by a cross-sectional view).

As illustrated in FIG. 4, the second brake BR2 mainly includes a hub member 101 coupled to the transmission case 11, a drum member 102 which is a rotating member coupled to the ring gear R3 of the third gear set PG3, a plurality of friction plates 103 disposed between the hub member 101 and the drum member 102, and a piston 108 fitted into a cylinder 107 comprised of an outer cylindrical part 104, a bottom part 105, and an inner cylinder part 106 which are coupled to the transmission case 11. The piston 108 is movable in the axial direction between an engaged position at which the plurality of friction plates 103 are engaged with each other and a disengaged position at which the plurality of friction plates 103 are disengaged from each other. When the plurality of friction plates 103 are engaged with each other, the second brake BR2 becomes in the engaged state, and when the plurality of friction plates 103 are disengaged from each other, the second brake BR2 becomes in the disengaged state.

The second brake BR2 also includes an engaging hydraulic pressure chamber 109 for applying a hydraulic pressure (engaging hydraulic pressure) to the piston 108 to set the piston 108 at the engaged position, a disengaging hydraulic pressure chamber 110 for applying a hydraulic pressure (disengaging hydraulic pressure) to the piston 108 to set the piston 108 at the disengaged position, and a spring 111 provided inside the engaging hydraulic pressure chamber 109. The spring 111 biases the piston 108 in an engaged direction from the disengaged position to a zero-clearance position at which the plurality of friction plates 103 achieve a zero-clearance state (i.e., a state where the plurality of friction plates 103 slip on each other). By the spring 111 biasing the piston 108 in the engaged direction, the plurality of friction plates 103 become in the zero-clearance state, both when the engaging hydraulic pressure is not given and when the disengaging hydraulic pressure is not given.

The second brake BR2 is engaged by supplying the engaging hydraulic pressure to the engaging hydraulic pressure chamber 109 to move to the engaged position the piston 108 biased to the zero-clearance position by the spring 111. Further, by eliminating the engaging hydraulic pressure and supplying the disengaging hydraulic pressure to the disengaging hydraulic pressure chamber 110, the piston 108 which is located at the engaged position is moved to the zero-clearance position, and by moving the piston 108 to the disengaged position against the biasing force of the spring 111, the second brake BR2 is disengaged.

When starting the vehicle 1, such a second brake BR2 is engaged after performing a slip control and engaging other friction engagement elements which form a gear stage for the vehicle to start (i.e., the second brake BR2 is engaged at the end). In this case, in the second brake BR2, the piston 108 is biased by the spring 111 from the disengaged position to the zero-clearance position of the plurality of friction plates 103 (at this time, the plurality of friction plates 103 slip), and the piston 108 is moved by the engaging hydraulic pressure from the zero-clearance position to the engaged position to engage the plurality of friction plates 103. Note that, hereinafter, a torque transmitted by the second brake BR2 when the plurality of friction plates 103 are in the zero-clearance state by the spring 111 (i.e., when they are in the slipping state), is referred to as "zero touch torque."

Next, further referring to FIG. 4, the hydraulic pressure control valve 120 which adjusts the hydraulic pressure applied to the second brake BR2 is described. The hydraulic pressure control valve 120 has an engaging solenoid valve 140 which adjusts the hydraulic pressure applied to the engaging hydraulic pressure chamber 109 (engaging hydraulic pressure), and a disengaging solenoid valve 150 which adjusts the hydraulic pressure applied to the disengaging hydraulic pressure chamber 110 (disengaging hydraulic pressure).

First, the engaging solenoid valve 140 is comprised of a linear solenoid valve which is able to linearly adjust the hydraulic pressure applied to the engaging hydraulic pressure chamber 109 (i.e., an opening of the valve is continuously changeable). In detail, oil from an oil pump (not illustrated) is supplied through an oil passage 141 to the engaging solenoid valve 140, and the engaging solenoid valve 140 supplies this oil to the engaging hydraulic pressure chamber 109 through an oil passage 142. The engaging solenoid valve 140 discharges (drains) oil inside the engaging hydraulic pressure chamber 109 through an oil passage 143.

Then, the disengaging solenoid valve 150 has a solenoid valve 152 as an on-off valve to which oil is supplied through an oil passage 151, and a shift valve 154 which operates as oil is supplied from the solenoid valve 152 through an oil passage 153. The shift valve 154 mainly has a case 154a where a plurality of ports (typically, ports P1-P4) are provided, a valve body 154b movably accommodated in the case 154a, and a hydraulic pressure chamber 154c to which oil for moving the valve body 154b is supplied.

In the disengaging solenoid valve 150, when the solenoid valve 152 is ON, oil from the oil pump (not illustrated) is supplied to the shift valve 154 through the oil passage 153 and the port P4. Therefore, oil is supplied to the hydraulic pressure chamber 154c of the shift valve 154 to apply a hydraulic pressure to the valve body 154b of the shift valve 154, and the valve body 154b is disposed on the right side in FIG. 4 inside the case 154a. In this case, in the shift valve 154, the port P3 is closed by the valve body 154b, and the port P1 and the port P2 communicate with each other (see a solid line in the shift valve 154 in FIG. 4). Therefore, oil from the oil pump (not illustrated) is supplied to the disengaging hydraulic pressure chamber 110 through an oil passage 155, the ports P2 and P1 of the shift valve 154, and an oil passage 157 in this order.

On the other hand, in the disengaging solenoid valve 150, when the solenoid valve 152 is OFF, oil from the oil pump (not illustrated) is not supplied to the shift valve 154 through the oil passage 153. Therefore, since oil is not supplied to the hydraulic pressure chamber 154c of the shift valve 154, the valve body 154b is disposed on the left side in FIG. 4 inside the case 154a. In this case, in the shift valve 154, the port P2 is closed by the valve body 154b, and the port P1 and the port P3 communicate with each other (see a broken line in the shift valve 154 in FIG. 4). Therefore, oil inside the disengaging hydraulic pressure chamber 110 is discharged through the oil passage 157, the ports P1 and P3 of the shift valve 154, and an oil passage 156 in this order.

As stated above, the second brake BR2 has the two hydraulic pressure chambers, comprised of the engaging hydraulic pressure chamber 109 and the disengaging hydraulic pressure chamber 110, and the engagement and the disengagement are changed by controlling the hydraulic pressure supplied to the hydraulic pressure chambers 109 and 110. On the other hand, other friction engagement elements (the first to third clutches CL1-CL3, and the first brake BR1) fundamentally have only one hydraulic pressure chamber (corresponding to the engaging hydraulic pressure chamber), and a hydraulic pressure is supplied to the hydraulic pressure chamber when engaged, and the hydraulic pressure of the hydraulic pressure chamber is released when disengaged.

[Electric Configuration]

Figure 5:
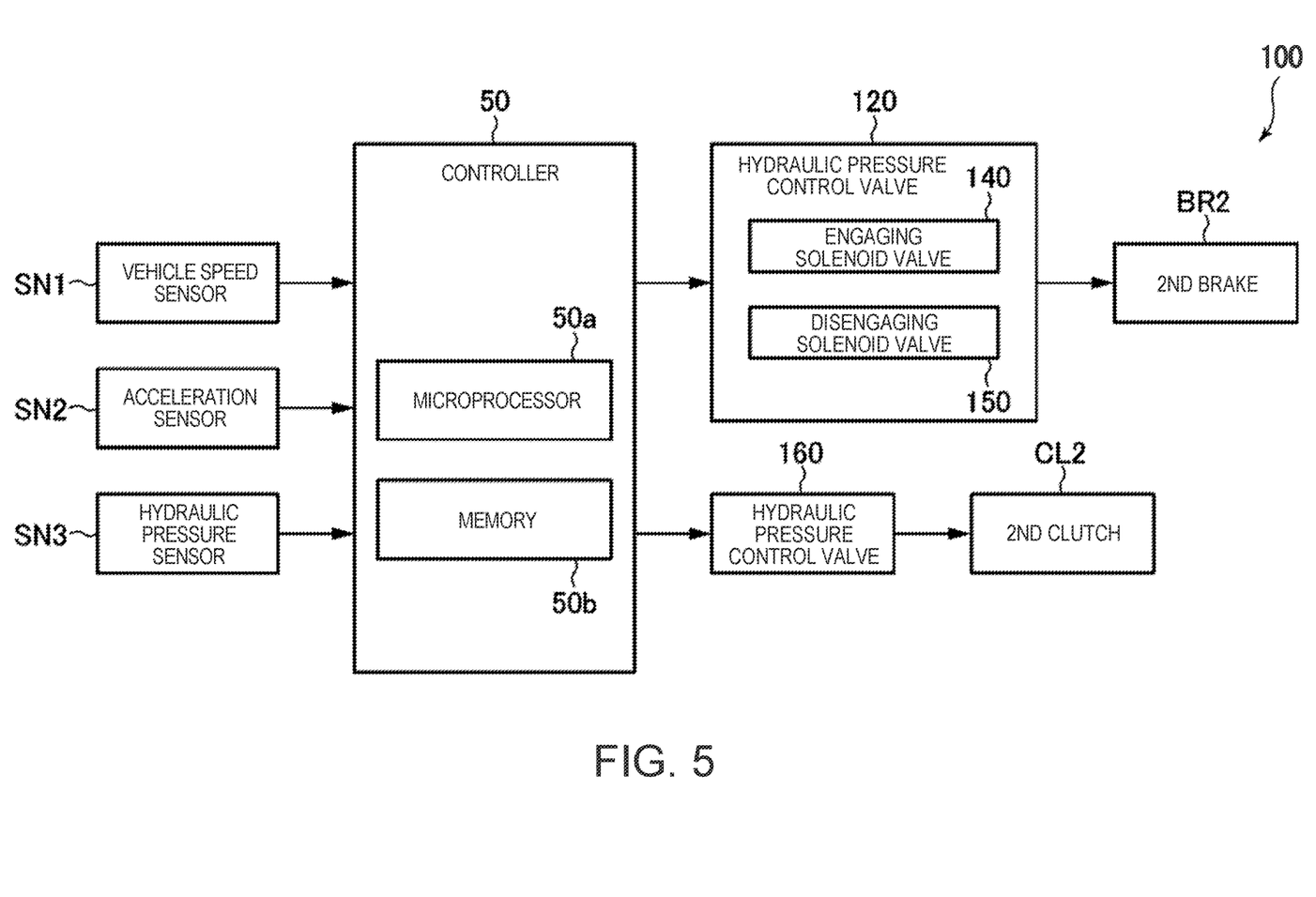
FIG. 5 is a block diagram illustrating an electrical configuration of the control system of the automatic transmission according to the embodiment of the present disclosure.

Next, referring to FIG. 5, an electrical configuration of the control system 100 of the vehicle 1 according to this embodiment is described. As illustrated in FIG. 5, signals from a vehicle speed sensor SN1, an acceleration sensor SN2, and a hydraulic pressure sensor SN3 are inputted into the controller 50. The speed sensor SN1 detects a speed of the vehicle 1 (vehicle speed). The acceleration sensor SN2 detects an acceleration of the vehicle 1. The hydraulic pressure sensor SN3 detects the hydraulic pressure applied to each of the five friction engagement elements (the first to third clutches CL1-CL3, and the first and second brakes BR1 and BR2).

The controller 50 is comprised of circuitry based on a well-known microcomputer. The controller 50 includes one or more microprocessors 50a as CPUs (Central Processing Units) which execute program(s), memory 50b which is comprised of, for example, RAM (Random Access Memory) and ROM (Read Only Memory) and stores the program(s) and the data, and an input/output bus which performs input/output of electric signals. Note that the controller 50 is comprised of an ECU (Electronic Control Unit) and a TCM (Transmission Control Module), for example.

As illustrated in FIG. 5, mainly, the controller 50 controls the hydraulic pressure applied to the second brake BR2 by outputting a control signal to the hydraulic pressure control valve 120 based on the signals from the sensors SN1-SN3 to change the second brake BR2 between the engaged state and the disengaged state, and controls the hydraulic pressure applied to the second clutch CL2 by outputting a control signal to a hydraulic pressure control valve 160 to change the second clutch CL2 between the engaged state and the disengaged state. In more detail, in order to change the second brake BR2 between the engaged state and the disengaged state, the controller 50 controls the opening of the engaging solenoid valve 140 of the hydraulic pressure control valve 120 to adjust the hydraulic pressure applied to the engaging hydraulic pressure chamber 109 of the second brake BR2, and controls ON/OFF of the disengaging solenoid valve 150 (strictly, it is the solenoid valve 152, but, hereinafter, the disengaging solenoid valve 150 is representatively illustrated) of the hydraulic pressure control valve 120 to adjust the hydraulic pressure applied to the disengaging hydraulic pressure chamber 110 of the second brake BR2.

Thus, the controller 50 controls the hydraulic pressure control valve 120 and the hydraulic pressure control valve 160 so that each of the second brake BR2 and the second clutch CL2 is changed between the engaged state and the disengaged state, to set the automatic transmission 10 to a desired gear stage (see FIG. 3). For example, when the gear stage is changed from the 5th gear where the second brake BR2 is engaged and the second clutch CL2 is disengaged to the 6th gear where the second brake BR2 is disengaged and the second clutch CL2 is engaged (the first and third clutches CL1 and CL3 are engaged in both the 5th gear and the 6th gear), the controller 50 controls the hydraulic pressure control valve 120 and the hydraulic pressure control valve 160 to disengage the engaged second brake BR2 and engage the disengaged second clutch CL2.

Note that, in FIG. 5, only the representative second brake BR2 and second clutch CL2 related to a control according to this embodiment (described later) are illustrated. However, the controller 50 controls the hydraulic pressure control valve provided to each friction engagement element so that not only the second brake BR2 and the second clutch CL2 but also other friction engagement elements (the first and third clutches CL1 and CL3, and the first brake BR1) are changed between the engaged state and the disengaged state to change the gear stage of the automatic transmission 10 among the plurality of gear stages (FIG. 3).

Here, the second brake BR2 is an example of a "first friction engagement element" in the present disclosure, and the second clutch CL2 is an example of a "second friction engagement element" in the present disclosure. Further, the engaging solenoid valve 140 and the disengaging solenoid valve 150 of the hydraulic pressure control valve 120 for controlling the second brake BR2 are examples of a "first hydraulic pressure control valve" and a "second hydraulic pressure control valve" in the present disclosure, respectively, and the hydraulic pressure control valve 160 for controlling the second clutch CL2 is an example of a "third hydraulic pressure control valve" in the present disclosure.

[Details of Control]

Next, the detailed control performed by the controller 50 in this embodiment is described. Here, using a situation of changing the gear stage from the 5th gear to the 6th gear as an example, a method of controlling the hydraulic pressure control valve 120 to disengage the second brake BR2 and controlling the hydraulic pressure control valve 160 to engage the second clutch CL2 is described.

In this embodiment, when changing the second brake BR2 in the engaged state to the disengaged state (i.e., when changing the gear stage from the fifth gear to the sixth gear), the controller 50 performs, for the second brake BR2, a first control in which the engaging solenoid valve 140 of the hydraulic pressure control valve 120 is controlled to raise the hydraulic pressure applied to the engaging hydraulic pressure chamber 109, a second control in which after the first control the disengaging solenoid valve 150 of the hydraulic pressure control valve 120 is controlled to raise the hydraulic pressure applied to the disengaging hydraulic pressure chamber 110, and a third control in which after the second control the engaging solenoid valve 140 is controlled to reduce the hydraulic pressure applied to the engaging hydraulic pressure chamber 109.

Further, when performing the first to third controls to the second brake BR2, the controller 50 further performs a fourth control in which the hydraulic pressure control valve 160 is controlled to raise the hydraulic pressure applied to the second clutch CL2. Particularly, the controller 50 starts and ends the third control to the second brake BR2 (i.e., the third control in which the engaging solenoid valve 140 is controlled to reduce the engaging hydraulic pressure) and the fourth control to the second clutch CL2 substantially simultaneously.

Figure 6:
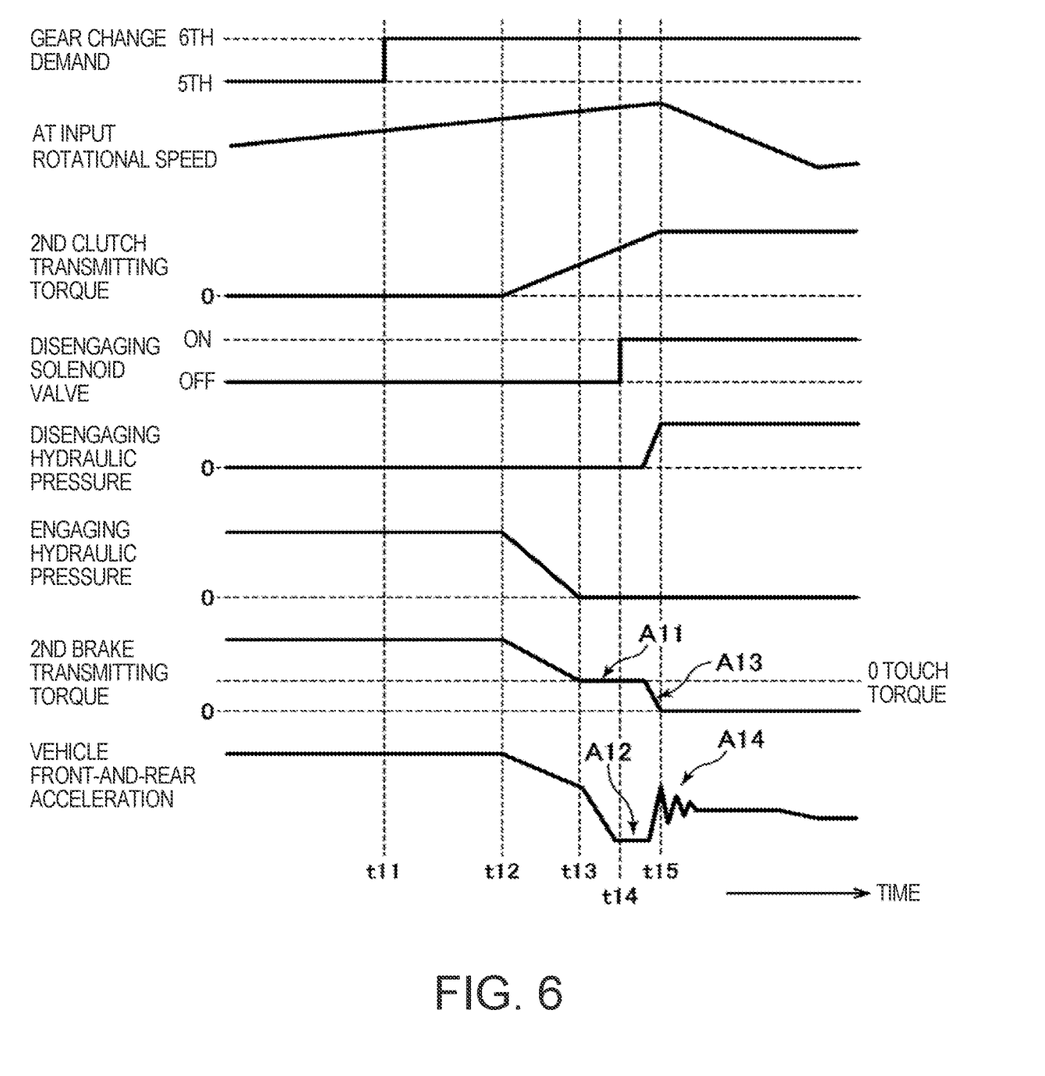
FIG. 6 is a time chart of a control according to a comparative example.
Figure 7:
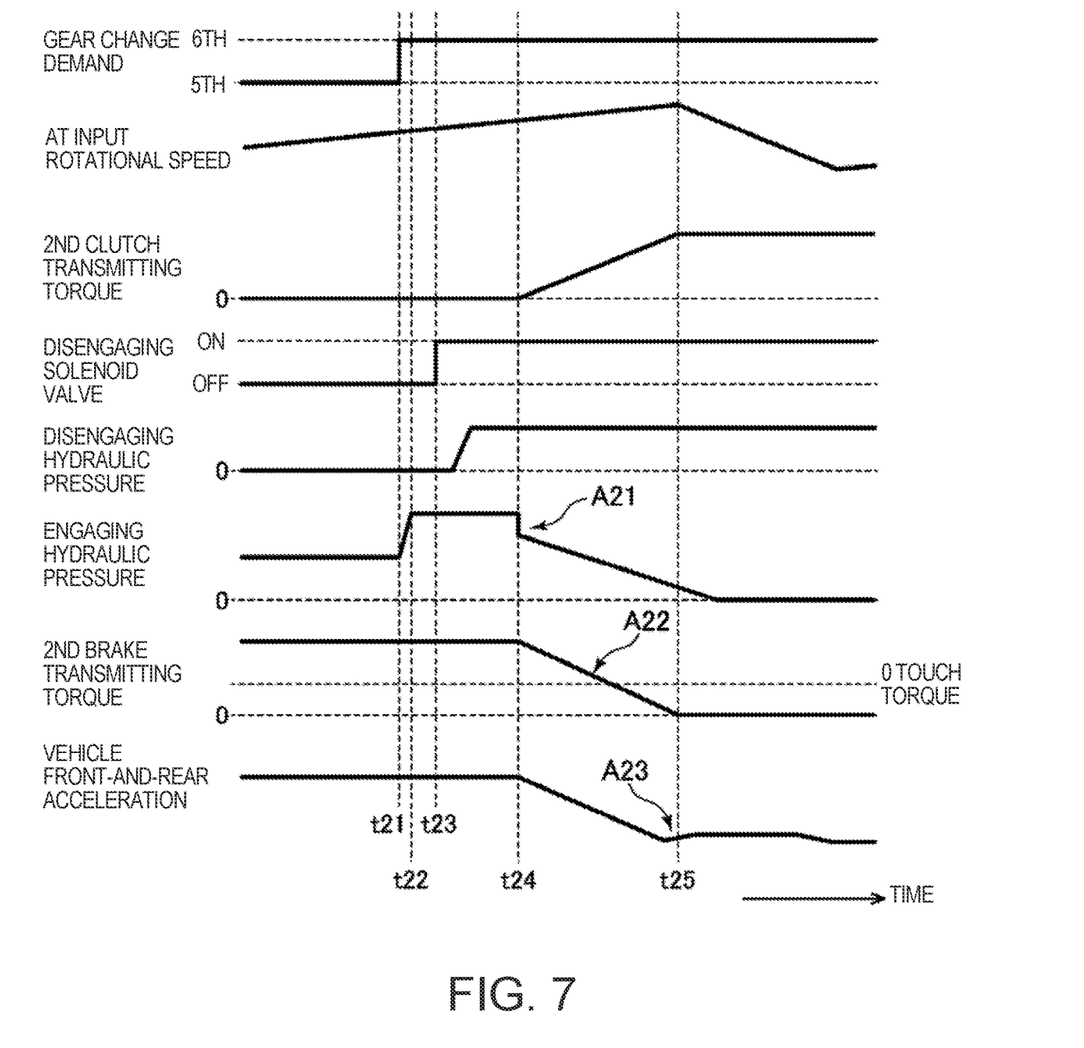
FIG. 7 is a time chart of a control according to the embodiment of the present disclosure.

Next, referring to FIGS. 6 and 7, the control according to this embodiment is described in more detail. Here, the control according to this embodiment is described, while comparing it with a control according to a comparative example. FIG. 6 is a time chart of the control according to the comparative example, and FIG. 7 is a time chart of the control according to this embodiment. As described above, in this embodiment, when changing the gear stage from the fifth gear to the sixth gear, the controller 50 performs, to the second brake BR2, the control which raises the engaging hydraulic pressure (first control), the control which raises the disengaging hydraulic pressure (second control), and the control which reduces the engaging hydraulic pressure (third control), in this order. On the other hand, in the comparative example, when changing the gear stage from the fifth gear to the sixth gear, to the second brake BR2, the control which raises the engaging hydraulic pressure as in this embodiment is not performed, and the control which raises the disengaging hydraulic pressure is performed after the control which reduces the engaging hydraulic pressure is performed.

First, referring to FIG. 6, the control according to the comparative example is described. FIG. 6 illustrates, from the top, temporal changes in a gear-change demand, a rotational speed of the input shaft 12 of the automatic transmission 10 (AT input rotational speed), a transmitting torque of the second clutch CL2, ON/OFF of the disengaging solenoid valve 150 of the second brake BR2, a disengaging hydraulic pressure, an engaging hydraulic pressure, a transmitting torque of the second brake BR2, and a vehicle front-and-rear acceleration. In the comparative example, first, at time t11, a gear-change demand for changing the gear stage from the fifth gear to the sixth gear is issued, and from a subsequent time t12, the hydraulic pressure control valve 160 is controlled so that the transmitting torque of the second clutch CL2 rises gradually. Further, at the same time, the engaging solenoid valve 140 is controlled so that the engaging hydraulic pressure lowers gradually to reduce the transmitting torque of the second brake BR2 gradually.

Then, at time t13, since the engaging hydraulic pressure becomes 0 (i.e., all the oil inside the engaging hydraulic pressure chamber 109 is discharged), and the plurality of friction plates 103 in the second brake BR2 reach the zero-clearance state by the spring 111, the transmitting torque of the second brake BR2 is maintained at the zero touch torque described above (arrow A11). Thus, since the second brake BR2 becomes on the interlock side if the second brake BR2 stays at the zero-touch torque, draw-in of the torque becomes strong and an acceleration waveform of the vehicle 1 becomes a bottomed shape (arrow A12).

Then, at time t14 when the second brake BR2 stays at the zero-touch torque, by turning ON the disengaging solenoid valve 150 to raise the disengaging hydraulic pressure, the transmitting torque of the second brake BR2 is reduced to 0 (Nm) (time t15). In this case, since the transmitting torque of the second brake BR2 changes suddenly (arrow A13), a shock due to the change in acceleration occurs because the disengaged and engaged timings of the second brake BR2 and the second clutch CL2 (replacing timing) and the torque down timing get worse (arrow A14).

Then, referring to FIG. 7, the control according to this embodiment is described. FIG. 7 also illustrates, from the top, temporal changes in a gear-change demand, an AT input rotational speed, a transmitting torque of the second clutch CL2, ON/OFF of the disengaging solenoid valve 150 of the second brake BR2, a disengaging hydraulic pressure, an engaging hydraulic pressure, a transmitting torque of the second brake BR2, and a vehicle front-and-rear acceleration, similarly to FIG. 6. In this embodiment, at time t21 when the gear-change demand for changing the gear stage from the fifth gear to the sixth gear is issued, the controller 50 controls the engaging solenoid valve 140 to raise the engaging hydraulic pressure of the second brake BR2 to maintain the raised engaging hydraulic pressure after time t22. Thus, by maintaining the state where the engaging hydraulic pressure sufficient for the second brake BR2 is given, it is certainly suppressed that the engaging hydraulic pressure is overcome by the disengaging hydraulic pressure when applying the disengaging hydraulic pressure thereafter, and the second brake BR2 is disengaged.

Then, at time t23, the controller 50 turns ON the disengaging solenoid valve 150, and raises the disengaging hydraulic pressure of the second brake BR2. In this case, since the raised engaging hydraulic pressure is maintained as described above, the transmitting torque of the second brake BR2 will not change, even if the disengaging hydraulic pressure is raised. Then, at time t24, the controller 50 controls the hydraulic pressure control valve 160 to gradually raise the transmitting torque of the second clutch CL2. At the same time, the controller 50 controls the engaging solenoid valve 140 so that the engaging hydraulic pressure of the second brake BR2 is slightly reduced stepwisely (arrow A21) and then is reduced gradually. Therefore, the transmitting torque of the second brake BR2 is reduced toward 0 (Nm) gradually at a constant rate of change (i.e., linearly) (arrow A22). In this case, unlike the comparative example, the transmitting torque of the second brake BR2 will not stay at the zero-touch torque, nor change suddenly toward 0 (Nm) (arrows A11 and A13 in FIG. 6). Therefore, according to this embodiment, the shock due to the change in acceleration is suppressed effectively (arrow A23).

Note that the controller 50 simultaneously ends the control for raising the transmitting torque of the second clutch CL2 using the hydraulic pressure control valve 160 and the control for reducing the transmitting torque of the second brake BR2 using the engaging solenoid valve 140 (time t25).

Figure 8:
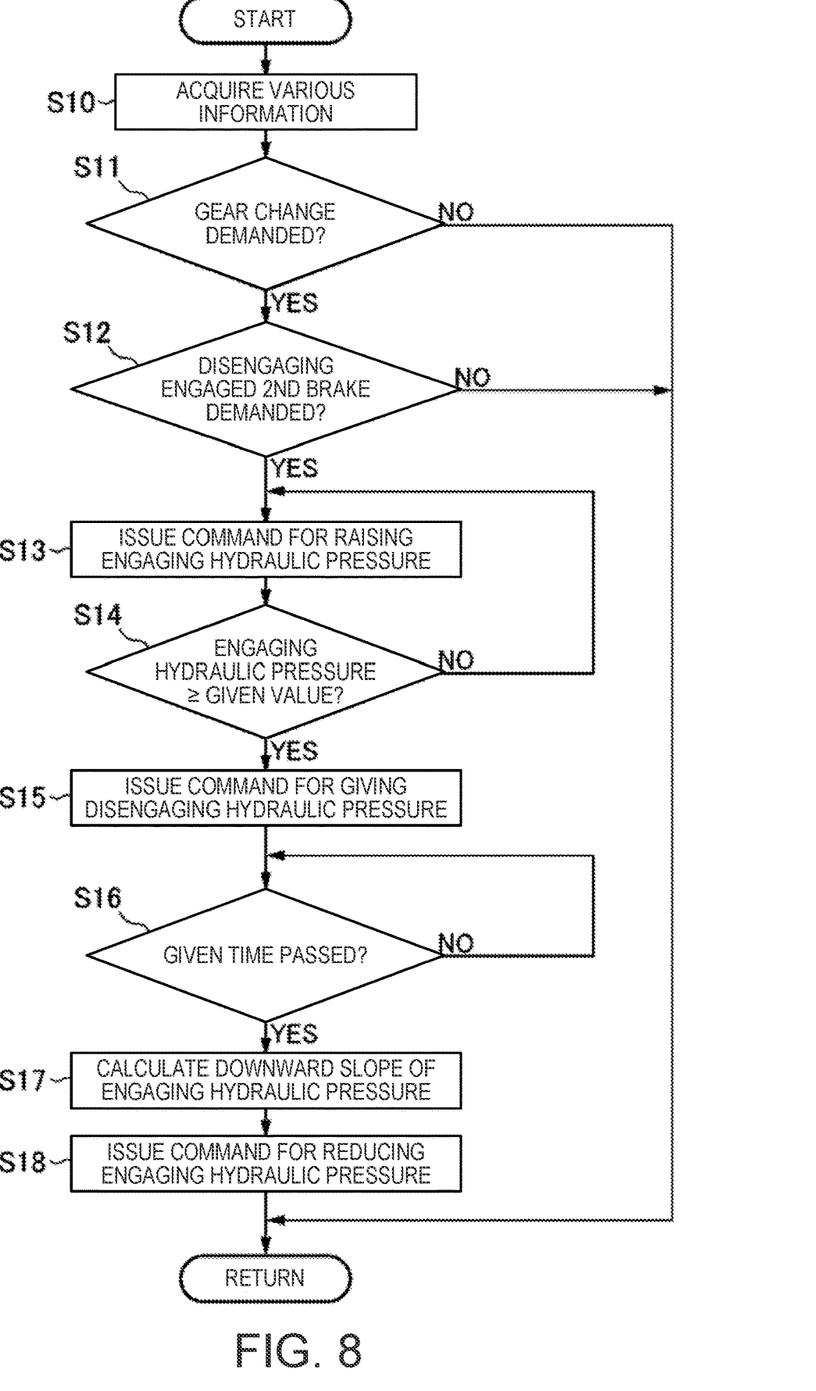
FIG. 8 is a flowchart illustrating the control according to the embodiment of the present disclosure.

Next, referring to FIG. 8, a flowchart illustrating the control (mainly, the control performed to the second brake BR2) according to this embodiment is described. This control is repeatedly performed by the microprocessor 50a in the controller 50 based on the program stored in the memory 50b at a given cycle.

First, at Step S10, the controller 50 acquires variety of information corresponding to the signals from the sensors provided in the vehicle 1. In detail, the controller 50 acquires at least the vehicle speed detected by the vehicle speed sensor SN1, the acceleration detected by the acceleration sensor SN2, and the hydraulic pressure detected by the hydraulic pressure sensor SN3.

Next, at Step S11, the controller 50 determines whether there is a gear-change demand of the automatic transmission 10. Fundamentally, since the gear stage of the automatic transmission 10 is set according to the vehicle speed, the controller 50 determines whether there is a gear-change demand based on the vehicle speed acquired at Step S10. As a result, if it is determined that there is a gear-change demand (Step S11: Yes), the controller 50 shifts to Step S12, and, on the other hand, if not determined that there is a gear-change demand (Step S11: No), the controller 50 escapes from the routine according to this control.

Next, at Step S12, the controller 50 determines whether there is a demand for changing the second brake BR2 in the engaged state to the disengaged state in order to change the gear stage of the automatic transmission 10. In a typical example, the situation where the second brake BR2 is to be changed in this way is the situation where the gear stage is changed from the fifth gear to the sixth gear (see FIG. 3). Thus, when the controller 50 determines that the gear stage is to be changed from the fifth gear to the sixth gear based on the vehicle speed acquired at Step S10, the controller 50 determines that there is a demand for disengaging the engaged second brake BR2. In this way, if it is determined that there is a disengaging demand of the engaged second brake BR2 (Step S12: Yes), the controller 50 shifts to Step S13. On the other hand, if not determined that there is a disengaging demand of the engaged second brake BR2 (Step S12: No), the controller 50 escapes from the routine according to this control.

Next, at Step S13, the controller 50 issues a command for raising the engaging hydraulic pressure of the second brake BR2. In detail, the controller 50 controls the engaging solenoid valve 140 of the hydraulic pressure control valve 120 to raise the engaging hydraulic pressure.

Next, at Step S14, the controller 50 determines whether the engaging hydraulic pressure raised at Step S13 became a given value determined beforehand or more. In a typical example, the controller 50 determines whether the engaging hydraulic pressure becomes the maximum pressure (corresponding to the line pressure of the hydraulic system). As a result, if it is determined that the engaging hydraulic pressure became the given value or more (Step S14: Yes), the controller 50 shifts to Step S15. In this case, the controller 50 maintains the engaging hydraulic pressure at the given value. On the other hand, if not determined that the engaging hydraulic pressure became the given value or more (Step S14: No), the controller 50 returns to Step S13. In this case, the controller 50 repeats Steps S13 and S14 until the engaging hydraulic pressure becomes the given value or more.

Next, at Step S15, the controller 50 issues a command for applying the disengaging hydraulic pressure to the second brake BR2. In detail, the controller 50 performs a control for turning ON the disengaging solenoid valve 150 of the hydraulic pressure control valve 120 to raise the disengaging hydraulic pressure.

Next, at Step S16, the controller 50 determines whether a given time defined beforehand passed after Step S15 is finished. This given time is defined based on a timing at which the reduction of the engaging hydraulic pressure is to be started (i.e., a timing at which the transmitting torque of the second brake BR2 is to be reduced). If it is determined that the given time passed (Step S16: Yes), the controller 50 shifts to Step S17, and, on the hand, if not determined that the given time passed (Step S16: No), the controller 50 returns to Step S16. In the latter case, the controller 50 repeats Step S16 until the given time passes.

Next, at Step S17, the controller 50 calculates a slope (i.e., an inclination, a rate of change) for reducing the engaging hydraulic pressure. In detail, the controller 50 calculates a downward slope of the transmitting torque of the second brake BR2 based on an acceleration slope to the extent not making the driver recognize the shock due to the acceleration, and calculates a downward slope of the engaging hydraulic pressure to realize this slope of the transmitting torque. In this case, the controller 50 may calculate the downward slope of the engaging hydraulic pressure based on the input torque to the automatic transmission 10.

Next, at Step S18, the controller 50 issues a command for reducing the engaging hydraulic pressure of the second brake BR2. In detail, the controller 50 controls the engaging solenoid valve 140 to reduce the engaging hydraulic pressure according to the slope calculated at Step S17 after reducing the engaging hydraulic pressure slightly in the stepwise fashion.

[Operation and Effects]

Next, operation and effects of the control system of the automatic transmission according to this embodiment are described. In this embodiment, when changing the second brake BR2 in the engaged state to the disengaged state, the controller 50 performs the first control in which the engaging solenoid valve 140 is controlled to raise the hydraulic pressure applied to the engaging hydraulic pressure chamber 109, the second control in which after the first control the disengaging solenoid valve 150 is controlled to raise the hydraulic pressure applied to the disengaging hydraulic pressure chamber 110, and the third control in which after the second control the engaging solenoid valve 140 is controlled to reduce the hydraulic pressure applied to the engaging hydraulic pressure chamber 109.

In this embodiment, since the engaging hydraulic pressure is once raised before raising the disengaging hydraulic pressure, it can prevent certainly that the engaging hydraulic pressure is overcome by the disengaging hydraulic pressure when applying the disengaging hydraulic pressure to disengage the second brake BR2. Further, in this embodiment, since the engaging hydraulic pressure is reduced after raising the disengaging hydraulic pressure, it can suppress the sudden change (nose diving) of the transmitting torque of the second brake BR2 when the disengaging hydraulic pressure is given. As described above, according to this embodiment, the shock due to the change in acceleration can be suppressed, when disengaging the second brake BR2.

Further, in this embodiment, the engaging solenoid valve 140 is comprised of the valve which is capable of linearly adjusting the engaging hydraulic pressure, and the disengaging solenoid valve 150 is comprised of the on-off valve. Therefore, when reducing the engaging hydraulic pressure in the third control, it can realize the control for linearly reducing the engaging hydraulic pressure by the engaging solenoid valve 140 at the desired rate of change to disengage the second brake BR2 smoothly and promptly. Therefore, it becomes possible to secure the shock control and the response when disengaging the second brake BR2. Thus, in this embodiment, it secures the controllability of the second brake BR2 by using the engaging solenoid valve 140 which is capable of linearly adjusting the hydraulic pressure. On the other hand, since the disengaging solenoid valve 150 which adjusts the disengaging hydraulic pressure is comprised of the on-off valve, it can realize the simple configuration and control configuration of the second brake BR2.

In this embodiment, when disengaging the second brake BR2 (in detail, when changing the gear stage from the fifth gear to the sixth gear), the controller 50 further performs, in addition to the first to third controls to the second brake BR2, the fourth control in which the hydraulic pressure control valve 160 is controlled to raise the hydraulic pressure applied to the second clutch CL2, and the controller 50 ends substantially simultaneously the third control to the second brake BR2 (i.e., the third control in which the engaging solenoid valve 140 is controlled to reduce the engaging hydraulic pressure) and the fourth control to the second clutch CL2. Therefore, the gear change can be completed smoothly.

Further, in this embodiment, the controller 50 starts substantially simultaneously the third control to the second brake BR2 and the fourth control to the second clutch CL2. Therefore, the response of the gear change can be secured.

Further, in this embodiment, the second brake BR2 is configured so that, both when the hydraulic pressure is not applied to the engaging hydraulic pressure chamber 109 and when the hydraulic pressure is not applied to the disengaging hydraulic pressure chamber 110, the plurality of friction plates 103 are in the zero-clearance state. Thus, the plurality of friction plates 103 become in the slipping state when the hydraulic pressure is not applied to the second brake BR2. By applying the hydraulic pressure to the second brake BR2 in this state, the second brake BR2 can be engaged promptly. Therefore, the response when engaging the second brake BR2 can be secured.

Further, in this embodiment, the second brake BR2 is changed to the engaged state, at least when starting the vehicle 1. According to the second brake BR2 which is in the zero-clearance state when the hydraulic pressure is not given as described above, when starting the vehicle 1, the second brake BR2 is engaged after carrying out the slip control, and therefore, the smooth start of the vehicle 1 can be realized with sufficient accuracy.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
10 Automatic Transmission
20 Engine
50 Controller
103 Friction Plate
108 Piston
109 Engaging Hydraulic Pressure Chamber
110 Disengaging Hydraulic Pressure Chamber
120 Hydraulic Pressure Control Valve
140 Engaging Solenoid Valve (First Hydraulic Pressure Control Valve)
150 Disengaging Solenoid Valve (Second Hydraulic Pressure Control Valve)
152 Solenoid Valve
154 Shift Valve
160 Hydraulic Pressure Control Valve (Third Hydraulic Pressure Control Valve)
BR1 First Brake
BR2 Second Brake (First Friction Engagement Element)
CL1 First Clutch
CL2 Second Clutch (Second Friction Engagement Element)
CL3 Third Clutch

What is claimed is:
1. A control system of a vehicle, comprising:
an automatic transmission provided with a first friction engagement element able to change between an engaged state and a disengaged state, the first friction engagement element including:
a plurality of friction plates;
a piston movable between an engaged position at which the plurality of friction plates are engaged and a disengaged position at which the plurality of friction plates are disengaged;
an engaging hydraulic pressure chamber configured to apply a hydraulic pressure to the piston to set the piston at the engaged position; and
a disengaging hydraulic pressure chamber configured to apply a hydraulic pressure to the piston to set the piston at the disengaged position;
a first hydraulic pressure control valve configured to adjust the hydraulic pressure applied to the engaging hydraulic pressure chamber of the first friction engagement element;

a second hydraulic pressure control valve configured to adjust the hydraulic pressure applied to the disengaging hydraulic pressure chamber of the first friction engagement element; and a controller configured to control the first and second hydraulic pressure control valves to change the first friction engagement element between the engaged state and the disengaged state, wherein, when changing the first friction engagement element from the engaged state to the disengaged state, the controller performs:

a first control in which the first hydraulic pressure control valve is controlled to raise the hydraulic pressure applied to the engaging hydraulic pressure chamber;

a second control in which after the first control the second hydraulic pressure control valve is controlled to raise the hydraulic pressure applied to the disengaging hydraulic pressure chamber; and     a third control in which after the second control the first hydraulic pressure control valve is controlled to reduce the hydraulic pressure applied to the engaging hydraulic pressure chamber.

2. The control system of claim 1, wherein the first hydraulic pressure control valve is comprised of a valve capable of linearly adjusting the hydraulic pressure applied to the engaging hydraulic pressure chamber, and the second hydraulic pressure control valve is comprised of an on-off valve.

3. The control system of claim 2, wherein the automatic transmission is further provided with a second friction engagement element different from the first friction engagement element, wherein the automatic transmission includes a first gear stage at which the first friction engagement element is engaged and the second friction engagement element is disengaged, and a second gear stage adjacent to the first gear stage, at which the first friction engagement element is disengaged and the second friction engagement element is engaged, wherein the control system further comprises a third hydraulic pressure control valve configured to adjust a hydraulic pressure applied to the second friction engagement element to engage the second friction engagement element, wherein, when changing the gear stage from the first gear stage to the second gear stage, the controller further performs a fourth control in which the third hydraulic pressure control valve is controlled to raise the hydraulic pressure applied to the second friction engagement element, in addition to the first to third controls, and wherein the controller ends the third control and the fourth control substantially simultaneously.

4. The control system of claim 3, wherein the controller starts the third control and the fourth control substantially simultaneously.

5. The control system of claim 2, wherein the first friction engagement element is configured so that the plurality of friction plates are in a zero-clearance state, both when the hydraulic pressure is not applied to the engaging hydraulic pressure chamber, and when the hydraulic pressure is not applied to the disengaging hydraulic pressure chamber.

6. The control system of claim 5, wherein the first friction engagement element is changed to the engaged state, at least when starting the vehicle.

7. The control system of claim 1, wherein the automatic transmission is further provided with a second friction engagement element different from the first friction engagement element, wherein the automatic transmission includes a first gear stage at which the first friction engagement element is engaged and the second friction engagement element is disengaged, and a second gear stage adjacent to the first gear stage, at which the first friction engagement element is disengaged and the second friction engagement element is engaged, wherein the control system further comprises a third hydraulic pressure control valve configured to adjust a hydraulic pressure applied to the second friction engagement element to engage the second friction engagement element, wherein, when changing the gear stage from the first gear stage to the second gear stage, the controller further performs a fourth control in which the third hydraulic pressure control valve is controlled to raise the hydraulic pressure applied to the second friction engagement element, in addition to the first to third controls, and wherein the controller ends the third control and the fourth control substantially simultaneously.

8. The control system of claim 1, wherein the first friction engagement element is configured so that the plurality of friction plates are in a zero-clearance state, both when the hydraulic pressure is not applied to the engaging hydraulic pressure chamber, and when the hydraulic pressure is not applied to the disengaging hydraulic pressure chamber.

9. The control system of claim 7, wherein the controller starts the third control and the fourth control substantially simultaneously.

10. The control system of claim 8, wherein the first friction engagement element is changed to the engaged state, at least when starting the vehicle.

* * * * *